(12) United States Patent
Balakrishnan et al.

(10) Patent No.: US 12,532,156 B2
(45) Date of Patent: Jan. 20, 2026

(54) METHOD AND SYSTEM FOR COLLECTION AND TRANSFORMATION OF DEVICE DATA FROM IoT DEVICES FOR CONSUMPTION BY DIFFERENT ENTITIES

(71) Applicant: Aeris Communications, Inc., San Jose, CA (US)

(72) Inventors: Subramanian Balakrishnan, Cupertino, CA (US); Yixiang Chen, Palo Alto, CA (US); Sundararaj Arunachalam, Naperville, IL (US); Jins George, Fremont, CA (US); Syed Zaeem Hosain, San Jose, CA (US); Drew S. Johnson, San Jose, CA (US); Vikram Viswanathan, Saratoga, CA (US)

(73) Assignee: Aeris Communications, Inc., Chicago, IL (US)

( * ) Notice: Subject to any disclaimer, the term of this patent is extended or adjusted under 35 U.S.C. 154(b) by 32 days.

(21) Appl. No.: 17/711,513

(22) Filed: Apr. 1, 2022

(65) Prior Publication Data
US 2022/0225079 A1 Jul. 14, 2022

Related U.S. Application Data

(63) Continuation-in-part of application No. 14/207,378, filed on Mar. 12, 2014, now abandoned.

(60) Provisional application No. 61/878,554, filed on Sep. 16, 2013, provisional application No. 61/780,234, filed on Mar. 13, 2013.

(51) Int. Cl.
*H04W 8/18* (2009.01)

(52) U.S. Cl.
CPC .................................. *H04W 8/186* (2013.01)

(58) Field of Classification Search
CPC ...................................................... H04W 8/186
See application file for complete search history.

(56) References Cited

U.S. PATENT DOCUMENTS

| | | | |
|---|---|---|---|
| 7,703,099 B2 | 4/2010 | Gaurav et al. |
| 8,200,775 B2 | 6/2012 | Moore |
| 8,209,402 B1 | 6/2012 | Smith et al. |
| 8,838,784 B1 | 9/2014 | Kalavade |
| 2002/0111907 A1 | 8/2002 | Ling |

(Continued)

OTHER PUBLICATIONS

International Search Report and Written Opinion from International Application No. PCT/US14/26338 mailed Aug. 7, 2014.

(Continued)

*Primary Examiner* — Jensen Hu
(74) *Attorney, Agent, or Firm* — Guntin & Gust, PLC; Atanu Das

(57) ABSTRACT

The present invention is directed towards a computer-implemented method and system for managing device data feeds. The computer-implemented method and system comprise using a data model to describe type of data received from the devices, grouping the received type of data based on a data description, and forwarding the device data to a receiver endpoint as directed by the subscription information comprising a receiver endpoint and a rule uniquely identified by the subscription identifier using application programming interface key to manage access to the device data.

20 Claims, 16 Drawing Sheets

(56) References Cited

U.S. PATENT DOCUMENTS

| | | |
|---|---|---|
| 2004/0103098 A1* | 5/2004 | Mitra .................... G06F 16/275 |
| 2006/0167860 A1 | 7/2006 | Eliashberg et al. |
| 2006/0248181 A1 | 11/2006 | Glassco et al. |
| 2006/0288011 A1 | 12/2006 | Gandhi |
| 2007/0124285 A1 | 5/2007 | Wright |
| 2007/0156809 A1 | 7/2007 | Dickinson et al. |
| 2007/0255741 A1 | 11/2007 | Geiger et al. |
| 2008/0021963 A1 | 1/2008 | Jana |
| 2008/0034056 A1 | 2/2008 | Renger et al. |
| 2008/0082393 A1 | 4/2008 | Ozzie et al. |
| 2008/0244091 A1* | 10/2008 | Moore .................. H04L 67/565 |
| | | 709/204 |
| 2009/0138593 A1 | 5/2009 | Kalvade |
| 2010/0083124 A1 | 4/2010 | Druzgalaski et al. |
| 2010/0100537 A1 | 4/2010 | Druzgalski |
| 2010/0100950 A1 | 4/2010 | Roberts |
| 2010/0299362 A1 | 11/2010 | Osmond |
| 2011/0110515 A1* | 5/2011 | Tidwell ................ H04N 21/812 |
| | | 380/200 |
| 2011/0167433 A1* | 7/2011 | Appelbaum ...... G06F 16/24565 |
| | | 719/318 |
| 2012/0158644 A1 | 6/2012 | Mital et al. |
| 2012/0221649 A1 | 8/2012 | Bhogal et al. |
| 2012/0278725 A1 | 11/2012 | Gordon et al. |
| 2012/0290543 A1 | 11/2012 | Duvvoori |
| 2013/0024364 A1 | 1/2013 | Shrivastava et al. |
| 2013/0059607 A1 | 3/2013 | Herz |
| 2013/0110775 A1* | 5/2013 | Forsythe ................. G06F 16/90 |
| | | 707/613 |
| 2013/0152047 A1 | 6/2013 | Moorthi et al. |
| 2013/0204825 A1 | 8/2013 | Su |
| 2013/0273886 A1 | 10/2013 | Mohajeri |
| 2013/0346302 A1 | 12/2013 | Purves |
| 2014/0047434 A1 | 2/2014 | Lam et al. |
| 2014/0101676 A1 | 4/2014 | Lovegrove et al. |
| 2014/0150078 A1 | 5/2014 | Wu et al. |
| 2014/0195644 A1* | 7/2014 | Marin .................. H04L 12/1859 |
| | | 709/218 |
| 2014/0244768 A1 | 8/2014 | Shuman |
| 2014/0280157 A1 | 9/2014 | Chen et al. |
| 2016/0180647 A1 | 6/2016 | Webb |
| 2016/0205106 A1 | 7/2016 | Yacoub |
| 2017/0064038 A1 | 3/2017 | Chen et al. |
| 2017/0148264 A1 | 5/2017 | Pichette et al. |
| 2018/0246968 A1* | 8/2018 | Barker ............... G06Q 10/0631 |

OTHER PUBLICATIONS

International Serch Report and Written Opinion from International Application No. PCT/US17/41846 mailed Sep. 21, 2017.

European Search Report-Application No. 14776030.0. mailed Jul. 14, 2016, 9 pages.

* cited by examiner

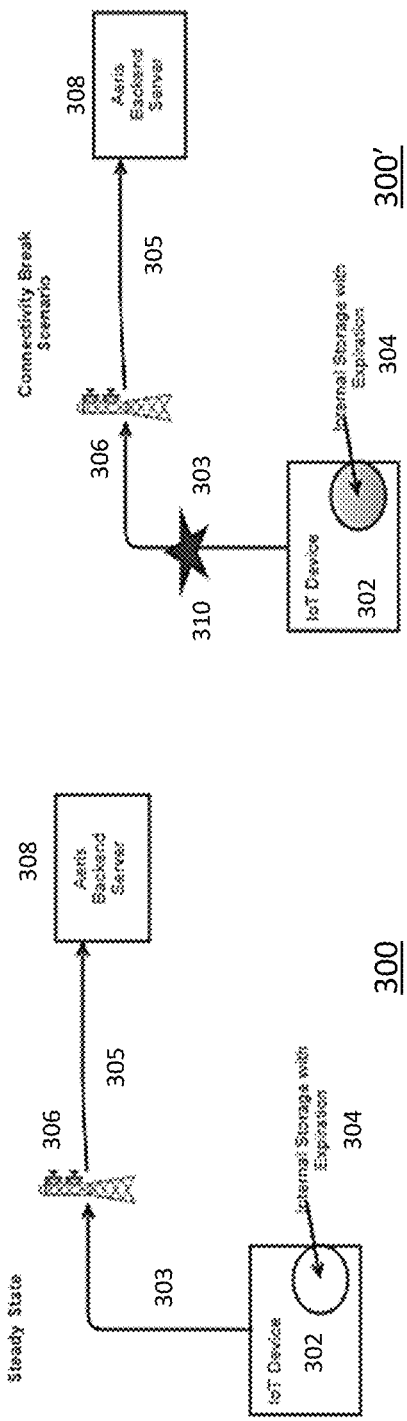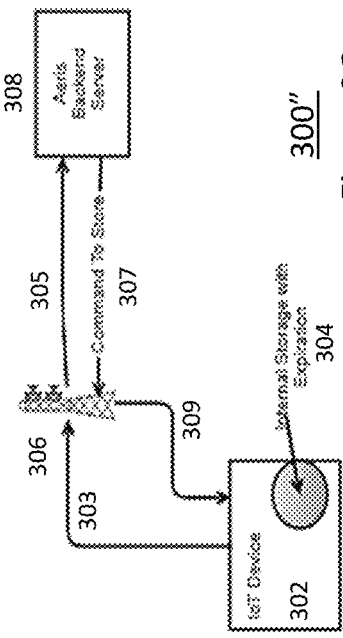

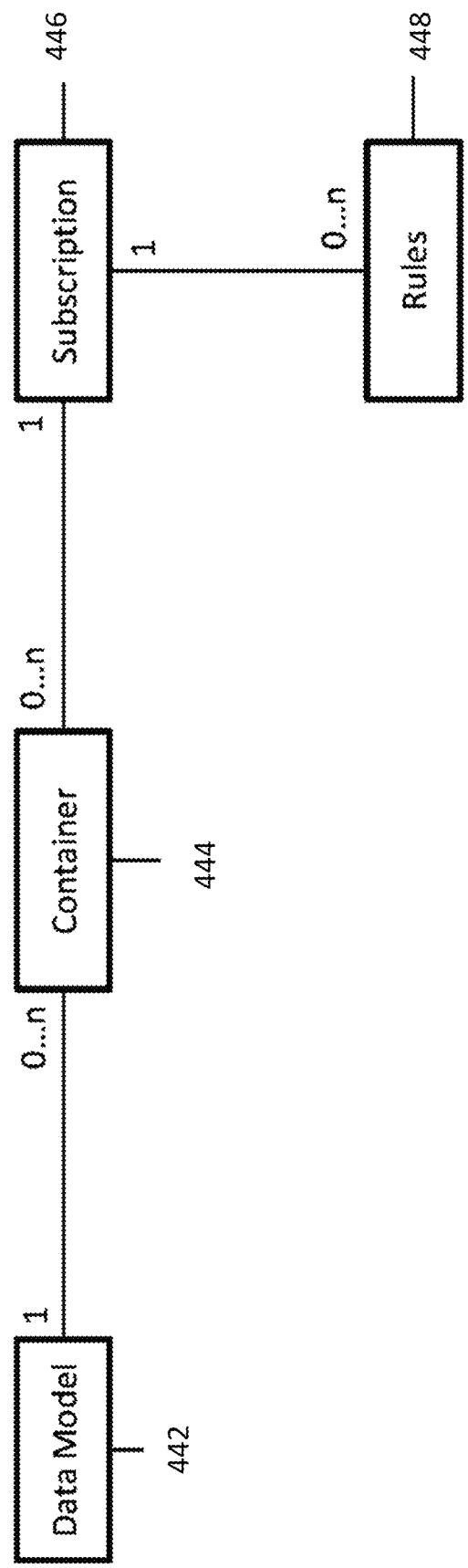

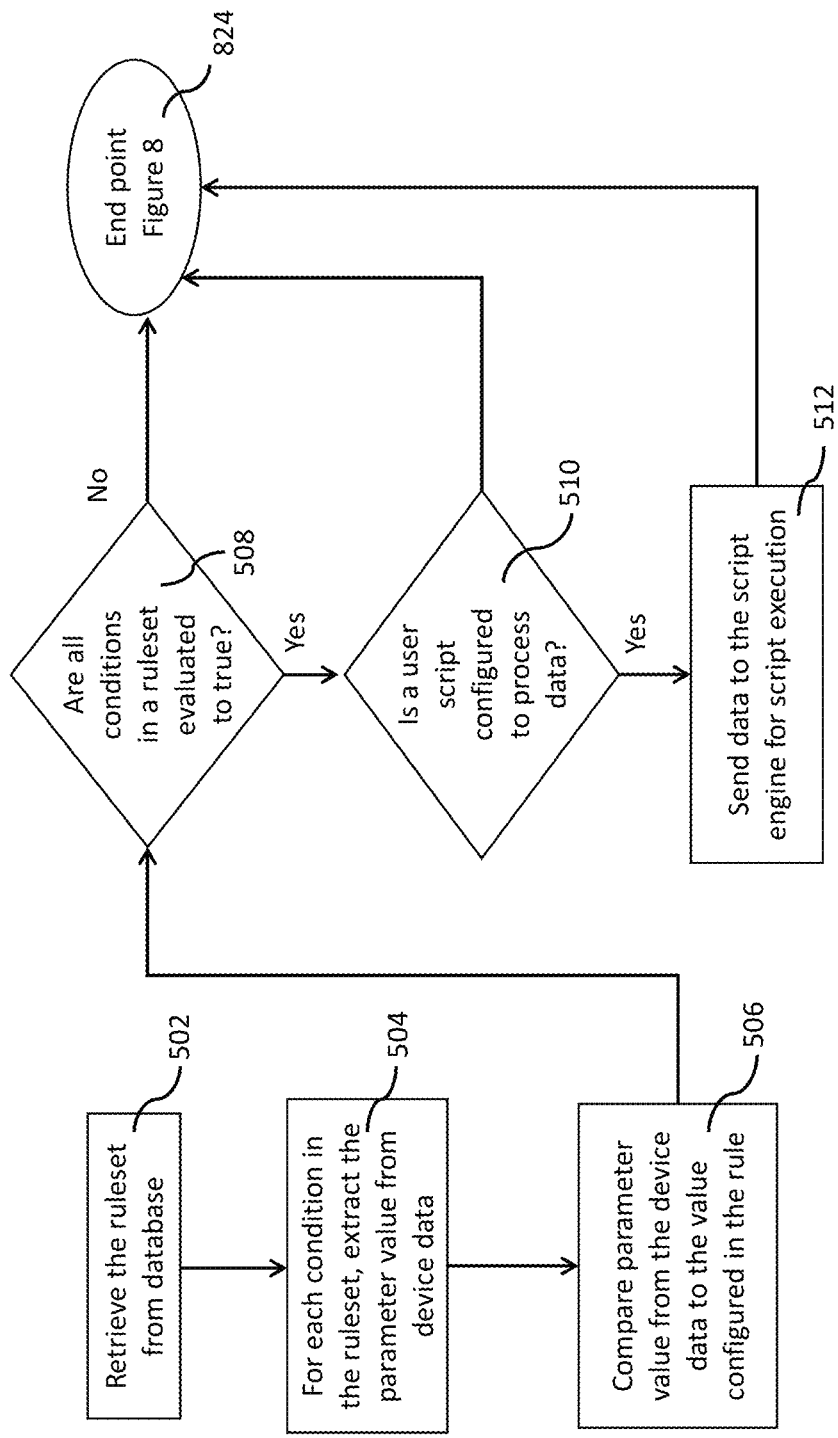

Figure 5B

Rule Example

This rule sends device data to an user script for processing if the value of the "light" parameter in the data equals to 20.

```
{
  "subscriptionType": "LONGPOLLING",
  "contact": "http://acpacqs.aeriscloud.com:80/v1/10745/containers/container-android-yc-1/subscriptions/subscription-container-android-yc-1-longpoll/notificationChannels/longPoll",
  "id": "subscription-container-android-yc-1-longpoll",
  "rule": {
    "assumptions": [
      {
        "parameter": "light",
        "op": "=",
        "value": "20"
      }
    ],
    "actionType": "EVAL"
  },
  "enablSub": true
}
```

Normalized Data

```
{
 "imsi": 123456789,
 "AerisInternalID": "abc",
 "ParentAccountid": 10000,
 "ChildAccountid": 10001,
 "Latitude": -45,
 "Longitude": -45,
 "Speed": "000",
 "Heading": 50
}
```

Data sent to Aeris Internal Data Consumer

```
{
 "imsi": 123456789,
 "AerisInternalID": "abc",
 "ParentAccountid": 10000,
 "ChildAccountid": 10001,
 "Latitude": -45,
 "Longitude": -45,
 "Speed": "000",
 "Heading": 50
}
```

Data sent to Parent Account

```
{
 "imsi": 123456789,
 "AerisInternalID": "xxxx",
 "ParentAccountid": 10000,
 "ChildAccountid": 10001,
 "Latitude": -45,
 "Longitude": -45,
 "Speed": "000",
 "Heading": 50
}
```

Data sent to 3rd party

```
{
  "imsi": zzzz,
  "AerisInternalID": "xxxx",
  "ParentAccountId": yyyy,
  "ChildAccountId": aaaa,
  "Latitude": -45,
  "Longitude": -45,
  "Speed": "000",
  "Heading": 50
}
```

Data sent to Child Account

```
{
  "imsi": 123456789,
  "AerisInternalID": "xxxx",
  "ParentAccountId": yyyy,
  "ChildAccountId": 10001,
  "Latitude": -45,
  "Longitude": -45,
  "Speed": "000",
  "Heading": 50
}
```

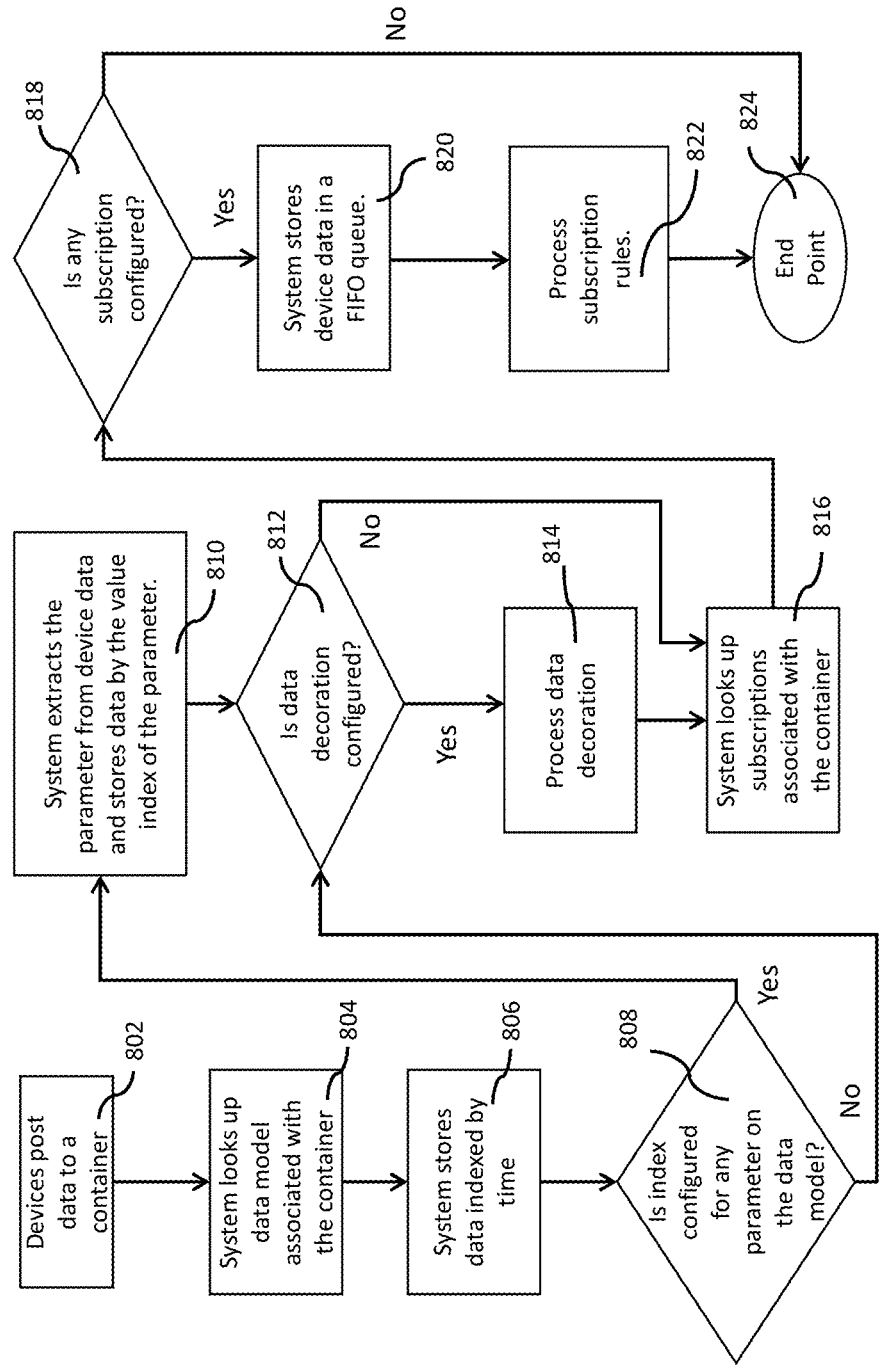

Data Decoration in Device Data Publishing

Figure 9B

Data Decoration Example

- Data decorator mapping example:
  - {"mappings":[{"keyName":"serialNumber",
  - "keyValue":"1234",
  - "nvps":[{"name":"taxiNumber","value":"22"},
  - {"name":"driver","value":"John Doe"}]}
  - ]}

API Key for Reading/Posting Data to Containers

Figure 11

A Data Model Example

METHOD AND SYSTEM FOR COLLECTION AND TRANSFORMATION OF DEVICE DATA FROM IoT DEVICES FOR CONSUMPTION BY DIFFERENT ENTITIES

CROSS-REFERENCE TO RELATED APPLICATIONS

This application is a Continuation-In-Part of the U.S. application Ser. No. 14/207,378 filed Mar. 12, 2014 which claims priority to U.S. provisional application Ser. No. 61/780,234, filed on Mar. 13, 2013 and U.S. provisional application Ser. No. 61/878,554, filed on Sep. 16, 2013, all of which are incorporated herein by reference in their entirety.

FIELD OF THE INVENTION

The present invention is directed to the management of data received from devices on a network.

BACKGROUND

An increasing number of devices or machines are enabled for connectivity to wired and wireless networks such as cellular or other wireless network services, including telephones and tablet computers as well as devices designed for machine-to-machine (M2M) communications, such as telematics devices in automobiles or devices enabled for monitoring and reporting on utilities or tracking assets. These devices may generate data that can be used for multiple purposes by a number of different parties, such as monitoring the operation of the device or the environment in which the device is operating.

SUMMARY OF THE INVENTION

In one or more embodiments, a computer-implemented method, system and computer program product are disclosed. In an embodiment, the computer-implemented method for managing device data feeds comprises using a data model at the destination database system that will receive and hold the data to describe the type of data received from each of a plurality of devices, grouping the received type of data into a plurality of containers based on a data description, configuring at least one subscription identifier to at least one of the plurality of containers, where each subscription identifier is associated with a receiver endpoint and at least one rule for processing the data uniquely identified by the subscription identifier, and using application programming interface (API) key to manage access to the device data by the receiver.

In an embodiment, the computer-implemented system for managing device data feeds comprises a gateway between one or more devices and one or more receiver endpoints, where the gateway is authorized to receive data feeds from such a device and to handle and, if applicable, store such data feeds, is configured with a data model of the data feed to be received from a given device to allow the gateway to interpret data received from the device, and subscription information associated with the data feed from that device where the subscription information comprises a receiver endpoint, and a rule for processing the data feed uniquely identified by the subscription's identifier.

In an embodiment, the computer program product stored on a computer readable medium for managing device data feeds, comprising computer readable instructions for causing a computer to control an execution of an application for managing device data feeds includes using a data model to describe type of data received from plurality of devices, grouping the received type of data into a plurality of containers based on a data description, and configuring at least one subscription identifier to at least one of the plurality of containers, wherein the at least one subscription identifier is associated with a receiver endpoint and at least one rule identified by the subscription identifier.

This solution has several advantages as it supports both simple "AND" and "OR" chaining of conditions. AND conditions can be configured in a single rule. OR conditions can be configured in multiple rules with one rule per condition or the sub-set of AND conditions within the enclosing OR condition set. Additionally, it allows complex rule programming with an executable program, i.e. script, for conditions that cannot be met with simple AND/OR condition chaining.

The method, system and computer program product described herein further includes configuring the at least one rule with a programming source code, wherein the action type is to send the device data to an internal system process to execute the source code, where the internal system process includes any one or more of: connecting each of the plurality of devices to a global endpoint of the network provider at a first instance of connection and directing the device data to where it belongs at second instance onwards, collecting data continually for a period of time depending on the context of use and memory provided to the device, using queuing mechanism to receive the device data even before the data is written to a database and allowing the device go to the next event, converting device data received in device specific format to normalized data format using one or more adapters via data driven parsers that extract the application-specific data into the normalized data format, providing anonymization rules to application programming interface (API) to anonymize the data before sending it to an endpoint, or a combination thereof.

BRIEF DESCRIPTION OF THE DRAWINGS

FIGS. 3A, 3B and 3C illustrate example methods and systems 300, 300' and 300" for handling small bursts of data, according to one or more embodiments of the present invention.

FIG. 4 illustrates a block diagram depicting an example of the relationship between different entities used during the management of device data feeds, according to one or more embodiments of the present invention.

FIG. 5A is a flow diagram illustrating various steps involved in processing data using subscription rules, according to one or more embodiments of the present invention.

FIG. 5B illustrates an example of a rule, according to one or more embodiments of the present invention.

FIGS. 7A-7E illustrate different levels of anonymizations based on subscriber information, according to an embodiment of the present invention.

FIG. 8 is a flow diagram illustrating various steps involved in an example of publishing device data to a receiver endpoint, according to one or more embodiments of the present invention.

FIG. 9B illustrates an example of data decoration mapping, according to one or more embodiments of the present invention.

FIG. 11 illustrates an example of a data model used to extract data from the incoming message, according to one or more embodiments of the present invention.

DETAILED DESCRIPTION

Figure 1:
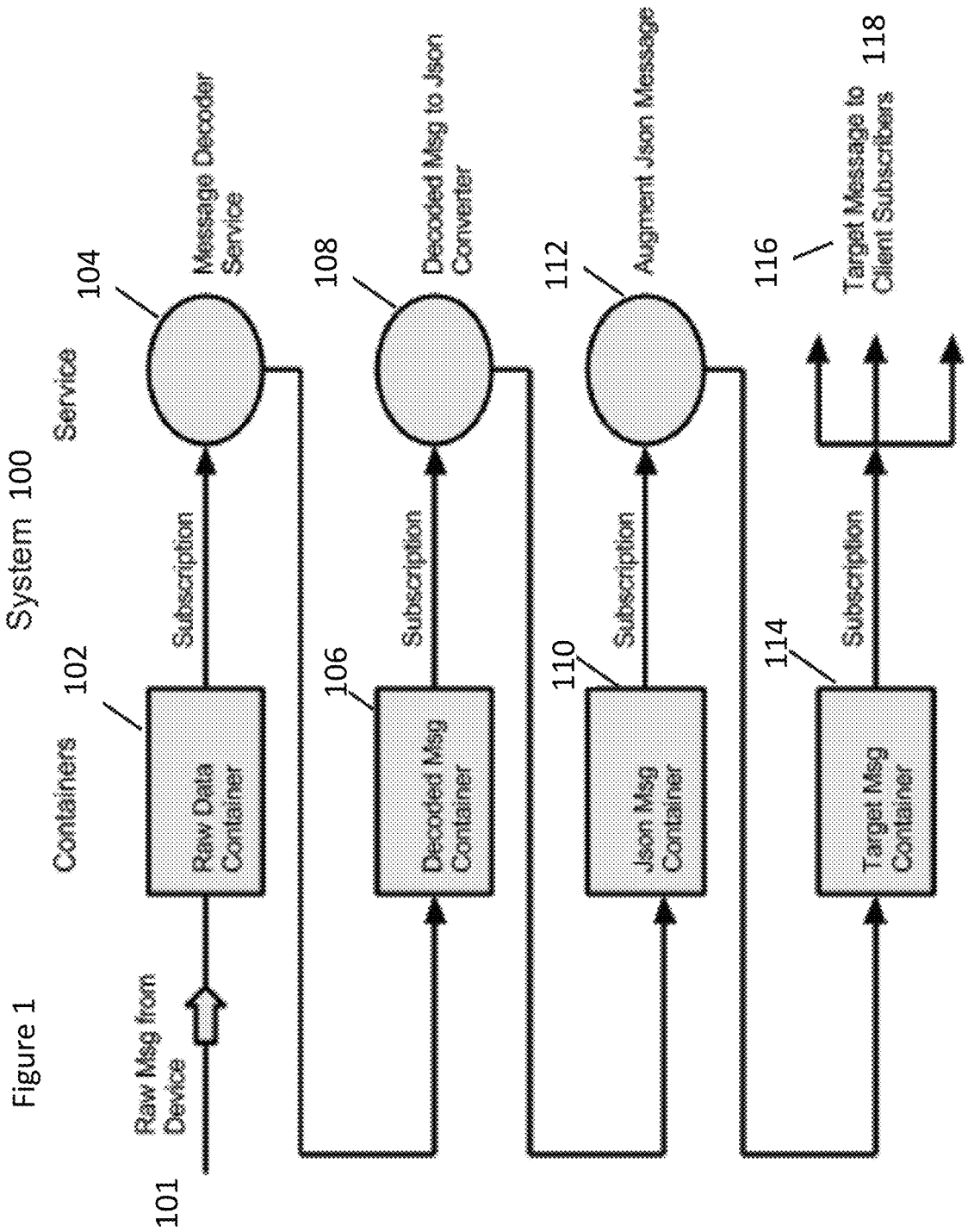
FIG. 1 illustrates an example of processing of raw device data as directed by subscription information, according to one or more embodiments of the present invention.

The present invention is directed to the management of data received from devices on a network.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

An increasing number of devices or machines are enabled for connectivity to wired and wireless networks such as cellular or other wireless network services, including telephones and tablet computers as well as devices designed for machine-to-machine (M2M) communications, such as telematics devices in automobiles or devices enabled for monitoring and reporting on utilities or tracking assets. These devices may generate data that can be used for multiple purposes by a number of different parties, such as monitoring the operation of the device or the environment in which the device is operating.

Accordingly, there is a need to be able to transform raw device data before it is consumed by an end-user application and to authorize and manage access to that data. In addition, end users of the data may want some data to be pushed to their applications in real-time, and direct other applications to query the data store for relevant data, which is not accommodated by existing models for handling device data feeds. What is needed to solve these issues is a method and system providing one easy-to-use end-to-end solution that overcomes the above-identified issues.

The present invention addresses this need and allows all of the entities who have an interest in the use of network communications by a device and the data generated by that device to economically and accurately manage, process, and use the data appropriate to them.

The present invention relates to any data received from a device operating on a network, whether the device is used by a human or is used in applications involving machine-to-machine communications. In any system involving devices on a network, data may be generated by devices for use by one or more end users. The data may be sent to some location for processing and, if applicable, storage and publishing to end users. Since different end users may only want to receive, or may only be authorized to receive, certain portions of the data feed from any given device, a method is required for processing the data and managing access by different end users.

The device described herein may include an IoT device or a machine to machine (M2M) device including but not limited to telephones and tablet computers as well as devices designed for machine-to-machine communications, such as telematics devices in automobiles or devices enabled for monitoring and reporting on utilities or tracking assets.

FIG. 1 illustrates processing of raw device data as directed by subscription information, according to an embodiment of the present invention. System 100 comprises various containers and the performance of services associated with subscriptions on data in those containers. As shown, a device posts raw messages with payload 101 to raw data container 102 which contains a number of messages, for example, raw device data or a packet of information from the device. The subscription configured to the raw data container 102 sends the data stream through a decoder service 104 and reposts the decoded and modified data to the decoded message container 106. The subscription configured to the decoded message container then posts the data through a message sent to the JSON converter 108, which reposts the processed data to the JSON message container 110. The subscription configured to the JSON message container then posts the data through Augment JSON Message 112 for processing using a data decoration mapping function or augmentation service and then posts augmented data to target message container 114 to which all the end users holding appropriate API keys 116 can subscribe to receive the augmented data 118.

Figure 2:
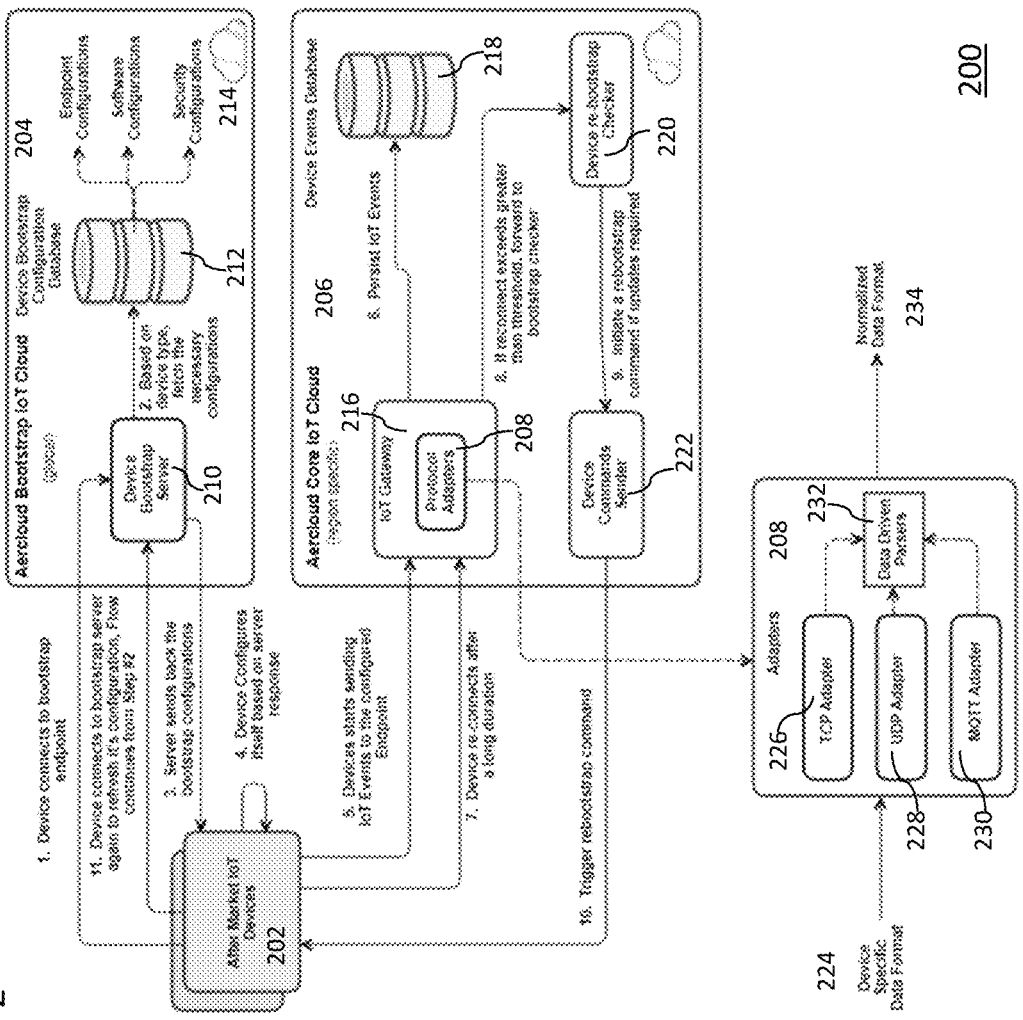
FIG. 2 illustrates an example of bootstrapping, according to one or more embodiments of the present invention.

FIG. 2 illustrates an example of bootstrapping, according to an embodiment of the present invention. For example, when a device is manufactured, the manufacturer of the device does not know where it is going to be shipped and/or installed. Therefore, most of the devices have the ability to Bootstrap, which may be defined as an ability to connect to an endpoint on a network, for example, to a bootstrap server, also known as a global endpoint, where the device/s first connect/s and retrieve/s information, the first time the device/s is/are used or powered up. The devices therefore are configured before release/sale and/or shipment to their destination to connect to this global endpoint and/or ready for network connection when they are powered up for the first time.

Although many devices are generally set up for this bootstrapping, some after-market devices may not be configured to do so. In such cases, when a device initially connects to a network provider, which may be a mobile network operator (MNO) or mobile virtual network operator (MVNO), the network provider system may realize that the device is in the after-market world and the device doesn't know where it needs to send the data because it is designed to be put in use anywhere.

The network provider may at that point configure the device for bootstrapping and build the intelligence against the "dumb" device, for example, a sensor, an actuator, etc., in the cloud. The network provider may have different cloud endpoints based on business unit, geographical location etc., for example, cloud endpoints in different countries. The device first connects to a central place at that location where it receives instructions to connect to a local endpoint. Thus, during the first instance of connection the device connects to a global endpoint of the network provider and second instance onwards the device data is directed to where it belongs or data forwarded to its actual endpoint.

For example, as illustrated in FIG. 2, the system 200 includes one or more IoT devices 202, network provider bootstrap IoT cloud 204 and core IoT cloud 206 which may be based on business unit, geographical location etc., for example, cloud endpoints in different countries (region specific). The network provider bootstrap IoT cloud 204 may further include device bootstrap server 210, device bootstrap configuration database 212, which may further include endpoint configurations, software configurations, and/or security configurations 214. The core IoT cloud 206 may further include IoT gateway 216 including protocol adapters 208, device events database 218, device re-bootstrap checker 220, and device command sender 222. The protocol adapters 208 may convert device data 224 received in device specific format to normalized data format 234 using specific adapters, for example, TCP adapter 226, UDP adapter 228, MQTT adapter 230, etc. via data driven parsers 232 that extract the application-specific data into the normalized data format 234.

As discussed above, once the device 202 is released/sold and/or shipped to its destination and/or when it is powered up for the first time, it connects to this global endpoint, device bootstrap server 210 via step 1. The device bootstrap server 210 fetches the necessary configurations from device bootstrap configuration database 212, which may further include endpoint configurations, software configurations and/or security configurations 214 via step 2 and sends them back to the device 202 via step 3. The device 202 then configures itself based on server response via step 4. Once configured, the device 202 starts sending IoT events to the configured end point, such as device events database 218 via IoT gateway 216 via steps 5 and 6. This data received at IoT gateway 216 is also referred to device data and is treated according one or more embodiments as described throughout the specification. For example, the protocol adapters 208 may convert device data 224 received in device specific format to normalized data format 234 using specific adapters, for example, TCP adapter 226, UDP adapter 228, MQTT adapter 230, etc. via data driven parsers 232 that extract the application-specific data into the normalized data format 234.

If the device 202 reconnects to core IoT cloud via step 7 after a duration of time more than the pre-defined threshold, the IoT gateway 216 forwards the device information to the re-bootstrap checker 220 via step 8. The re-bootstrap checker 220 may initiate a re-bootstrap command if updates are required via step 9 and trigger re-bootstrap command through device commands sender 222 via step 10.

Figure 3D:
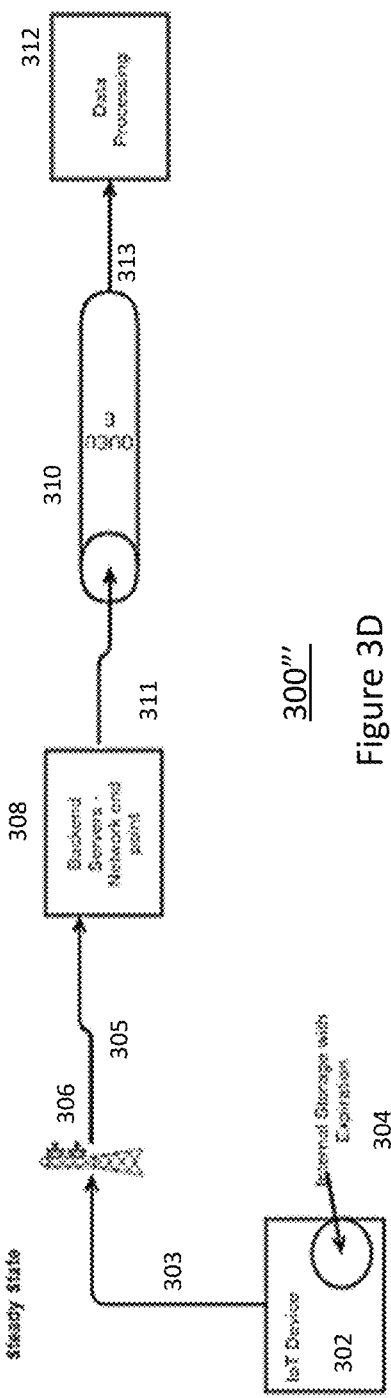
FIGS. 3D and 3E illustrate example methods and systems 300''' and 300'''' for handling large bursts of data, according to one or more embodiments of the present invention.
Figure 3E:
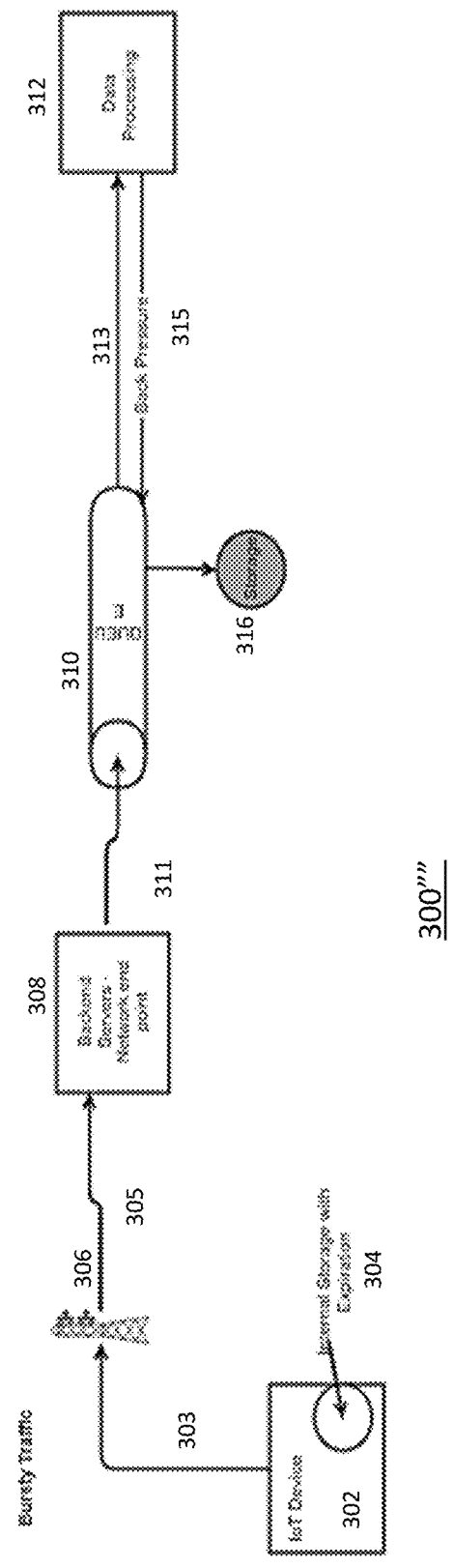

FIGS. 3A, 3B and 3C illustrate an example method and system for handling small bursts of data and FIGS. 3D and 3E illustrate example methods and systems for handling large bursts of data, according to one or more embodiments of the present invention. The amount of data IoT devices can produce may vary dramatically based on a variety of factors which depend on the nature of IoT device and it may be generated in the form of data bursts, which may be classified as: 1. Time and/or incidence-oriented; 2. Volume of devices; and 3. Cellular Outage. The method and system described herein provides for a mechanism so that to collect data continually for a period of time without losing it depending on the context of use and memory provided to the device, for example, some devices can hold data collected for up to 1 day, some devices can hold data collected for up to 1 week, and some devices can hold data for longer periods.

The time and/or incidence-oriented burst may be defined as an ability to send more data in certain contexts. The context may be described in terms of small bursts of data and large bursts of data.

The volume of devices sending the data may change from time to time. For example, some delivery trucks may have 100 deliveries one day and 2 deliveries the next day. The distance travelled by those trucks may change from day to day. For example, as during the current pandemic such as Covid-19, more people are getting essentials delivered to their home, resulting in larger number of deliveries and/or large amount of distance travelled by the delivery trucks vs. fewer number of deliveries and/or shorter distance travelled by the delivery trucks before Covid-19. It may also be a seasonal spike in the data gathered such as more deliveries during Christmas resulting in more data bursts. When the trucks are driven more, they generate more data which may also be sampled over shorter intervals of time and/or shorter distances travelled.

Encountering dead spots on a freeway is an example of a small burst. The devices through the sensors installed in them are collecting data as programmed, for example, continuously, at a specified interval, etc. When the device encounters a dead spot where there is no network connectivity, they are still collecting data. IoT devices keep accumulating this data even when there is no connectivity and may send the accumulated data when the connectivity is available again. This is a data burst caused at a device-level. Such events may happen with multiple devices everywhere randomly and can add up to another type of burst.

In a small burst of data, for example, a Uber driver in Jakarta, Indonesia picks up someone from the airport and drives them to a village where there is no network coverage because the wireless service doesn't support the operator that covers that village. When the Uber driver comes back to Jakarta, the device, for example, the vehicle, may upload all the data to a server where the data is supposed to be sent. In such case, the device may upload one day's worth of data rapidly, for example in 1 second.

As illustrated in FIG. 3A, the system 300 illustrates a steady state where device 302 with an internal storage 304 which may have limited storage capacity, and hence expiration, is connected to the MNO provider's backend server 308 via a network connection such as cellular tower 306 for cellular connection via steps 302 and 305. In an event of a connectivity break 310, illustrated as 300', illustrated in FIG. 3B, the data is not able to reach the back-end server 308. In such case, noticing that it hasn't received the data in a pre-defined interval of time, the back-end server 308 may send a command instructing the device 302 to store data via steps 307 and 309 as illustrated by system 300" in FIG. 3C.

FIGS. 3D and 3E illustrate example methods and systems for handling large bursts of data, according to one or more embodiments of the present invention. For example, a large data set may be produced in a crash, for example, high speed sampled data or delayed forwarding of stored data, triggered by a random event. This high/large burst of data traffic is sent to the entity collecting data in reaction to a crash detection. Although, normally high sample rate data may not be sent, a larger data set may be produced and sent when triggered by a pre-defined and/or anomalous event detection.

In a large burst of data, for example, during a cellular network outage, the devices such as vehicles cannot send data due to the loss of connectivity. Although cellular outages are generally fixed rapidly, there may be instances where the outages may last for extended periods of time, for example, few minutes to a few hours, when the devices are unable to send data. In such cases, when the cellular connectivity is restored, all the devices may connect at the same time without any coordination among themselves, resulting in a large burst of data.

This is different from traditional software, where the data sources may coordinate among themselves regarding when and how they send data, so that they do not cause problems to the back end application servers. However, IoT devices do not have the ability to coordinate during such events since they have less computing power to keep the device and connectivity costs down and the CPU footprint small and the battery down. Since IoT devices do not have the ability to coordinate during such events, they may start sending data the moment the internet connectivity is available, leading to huge bursts of data. For example, if the connection was down for 1 hour, all the data from that hour may be sent rapidly, for example in 1 second, as soon as the connection is restored.

These situations are unique to IoT as compared to traditional software streaming data to a database. The method and system described herein may provide a queuing mechanism to quickly receive the data, even before the data is written to a database, and let the device go to the next event as illustrated in FIGS. 3D and 3E.

For example, as illustrated in FIG. 3D, during steady state 300''' where device 302 with an internal storage 304 which may have limited storage capacity, and hence expiration, is connected to the MNO provider's backend server 308 via a network connection such as cellular tower 306 for cellular connection via steps 302 and 305. The back-end server then sends the received device data to a data processing system 312 via queue 310, via steps 311 and 313.

However, in the case of bursty traffic 300'''', as illustrated in FIG. 3E, especially in case of large bursty traffic, since the device 302 does not have the ability to store data due to limited storage capacity 304, the data may be lost. In such a scenario, the queue 310 is provided with storage 316. When a large amount of data is in the queue 310 for processing, for example, for being written to a database such as the data processing system 312, the queue 310 diverts the incoming data from the network provider's back-end server 308 to the storage 316 even before the incoming data is written to the database 312 and lets the device 302 go on to the next event.

This is different from writing data to a traditional database system where the device has to wait for the database to write the data and send an acknowledgement to the device so that the device can move on to the next step of acquiring data. The system and method described herein provides a quick acknowledgement stating that the device no longer needs to hold on to the data gathered and does not need to wait any longer.

FIG. 4 illustrates a block diagram of relationship between the resources associated with management of device data feeds and the publishing and consumption of the data. A device is associated with a data model 442, which is associated with a number of containers 444. A device posts data into the container 444 based on the data model 442 associated with that device and container 444. The container 444 is also associated with a subscription 446, meaning a set of rules and scripts associated with a particular end user or end user application. Each subscription 446 is associated with a rule 448, uniquely identified with the identifier of the subscription 446. The data posted in a container 444 is processed according to the subscription 446 associated with that container, according to the rules 448 associated with the subscription 446.

FIG. 5A is a flow diagram illustrating various steps involved in processing received device data using subscription rules, step 822, as shown in FIG. 8. The system checks if any subscription is configured with the data via step 818; if so, it stores the device data in a publishing queue based on the rule selected by the user (in this example, first in first out or FIFO) step 820, and processes subscription rules via step 822 as shown in FIG. 8. To process the subscription rules, as shown in FIG. 5A, the system first retrieves the ruleset from a database via step 502. For each condition in the ruleset, it extracts a parameter value from the device data via step 504 and compares the parameter value from the device data to the value configured in the rule via step 506. If it finds that all conditions in a ruleset evaluated are true via step 508, it further checks for a user script configured to process data via step 510. If a user script is so configured, it sends the data to the script engine for script execution step 512. If all conditions in a ruleset evaluated are not true or if no user script is configured to process data, the data is stored away without further processing via step 824 as shown in FIG. 8.

FIG. 5B illustrates an example of a rule where device data is sent to a script for processing if the value of the "light" parameter in the data equals to "20". As shown in FIG. 5B, a subscription is associated with a rule. The rule comprises of one or more conditions resulting in actions, an action type based on an outcome of evaluation of the rules, and a set of instructions to be carried out by an executable program or instructions to carry out the action type based on the outcome of evaluation of the rules. A condition consists of 3 parts: parameter, operator and value. As illustrated in the rule example, "parameter" is defined as "light", operator "op" is defined as "=" and "value" is defined as "20". The rule example further illustrates "actiontype" defined as "EVAL", and when all the conditions evaluated are true, the action specified in the subscription is performed as shown by "enabldSub": true.

Figure 6:
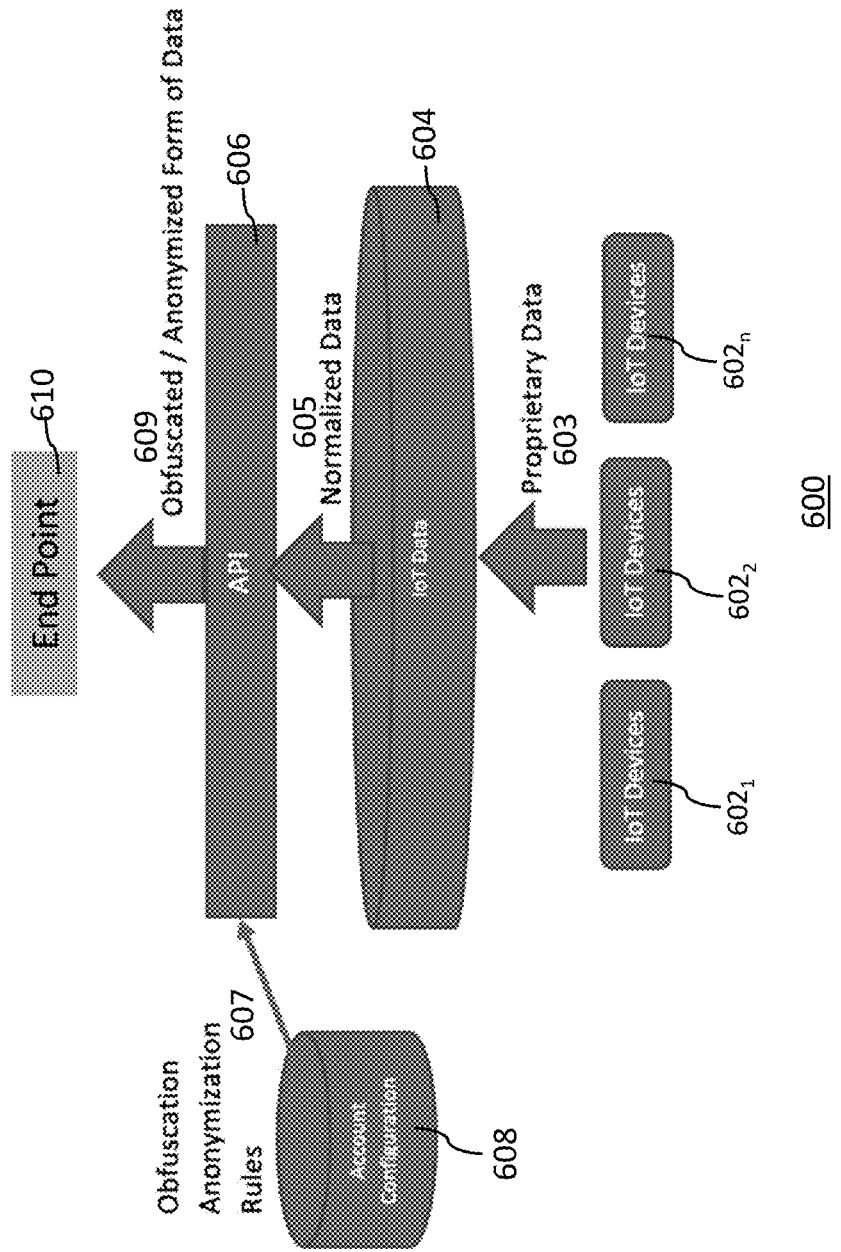
FIG. 6 is a flow diagram illustrating a method and system for anonymizing data, according to one or more embodiments of the present invention.

FIG. 6 is a flow diagram illustrating a method and system for anonymizing data, according to an embodiment of the present invention. Transforming the data received from devices so that the received device data can be consumed according to the needs of different interested entities, at the same time keeping part of the data private to meet privacy considerations, poses a significant challenge to an entity responsible for collecting, storing and making the data available for consumption to the interested entity. This challenge is even bigger when the data is collected from thousands or millions of devices working round the clock and the data transformation is to be performed to preserve anonymity, accuracy and availability to third party applications such applications from interested entities, without human interaction or human intervention. The data contains location information and anonymizing the location information poses a bigger challenge.

Many deployed devices, whether used by consumers or in machine-to-machine applications, send data to a central location for processing which may be owned by an entity different from one or more different entities who wish to consume the data for different purposes. The transformed data in such cases has to be anonymized and part of the data may need to be obfuscated for privacy considerations to limit access by certain entities to certain data. Presently, however, simple receipt of data at a data center does not accommodate the needs of different entities and applications to use different data from the same device or a group of devices.

For example, a car manufacturer may want all of the minute details regarding the operation of a moving vehicle for performance monitoring, while a car insurance company may only want data relating to mileage driven, location, and speed. Similarly, for example, an insurance company may care about speeding as well as location. The insurance company may have a legal right to see the speed but not the location, in which case, the location data may be obfuscated, e.g., grayed out, while allowing access to the speed data. For example, an insurance company may want to see average speeds for all devices or vehicles over a period of time in a particular area or at a particular location or may want to see an average speed for a device or vehicle during a particular time period for a segment.

Once the user/owner of the device authorizes data collection for further use, the interested entities may get access to all of the data generated by that device. This is particularly true for the after-market devices, for example, speed sensors installed by insurance companies in a fleet of vehicles.

The system and method 600 illustrated in FIG. 6 includes one or more IoT devices $602_1$, $602_1$, . . . $602_n$, a database 604, application programming interface (API) 606, and a specific endpoint 608 for receiving/depositing the data. As the devices $602_1$, $602_1$, . . . $602_n$, gather data, which may include proprietary data, the data is sent to the database 604. This data is then normalized and may be containerized as illustrated in FIGS. 1, 4, 5A and 5B and described in the description accompanying FIGS. 1, 4, 5A and 5B. However, some of that data, for example, the device identification number, account information of the account to which the device belongs, may have certain privacy restrictions. These restrictions on sharing of the data may be stored in a database 608, for example, account configuration database as illustrated in FIG. 6 and may be provided as obfuscation and/or anonymization rules to API 606 via step 607. If provided, these rules are then used by API 606 to obfuscate and/or anonymize the data before it is sent to the end point 610.

The examples of the obfuscations and/or anonymization of different data fields depending on the access permissions for each point is illustrated in FIGS. 7A-7E and described in detail in the description accompanying FIGS. 7A-7E.

FIGS. 7A-7E illustrate different levels of anonymizations based on subscriber information, according to an embodiment of the present invention. The system and method described herein uses rules for obfuscation/anonymization of data as part of account configuration. The account configuration is setup as part of account creation. The configuration allows obfuscation/anonymization at individual fields of rows of the data. As can be seen from the example illustrated in FIGS. 7A-7E, different fields may be obfuscated or anonymized for different levels of access.

For example, as shown in FIG. 7A, the normalized data includes values for all fields. Similarly, an internal data consumer who may have full access to this data may also receive the normalized data includes values for all fields as illustrated by FIG. 7B. As the data is consumed by the parent account to which the device (and/or the child account to which the device belongs) belongs, the internal identification number used by the system gathering and normalizing the data for further usage may not be visible to the parent account as illustrated by FIG. 7C. As the data is consumed by the child account to which the device belongs, along with the internal identification number used by the system gathering and normalizing the data for further usage, the parent account identifier may not be visible to the child account as illustrated by FIG. 7D.

The normalized data, when consumed by the third party, may be further restricted based on their access privileges. For example, a car manufacturer may want all of the minute details regarding the operation of a moving vehicle for performance monitoring, while a car insurance company may only want data relating to mileage driven, location and speed. Similarly, for example, an insurance company may care about speeding as well as location. The insurance company may have a legal right to see the speed but not the location, in which case, the location data may obfuscated, e.g., grayed out, while allowing access to the speed data. For example, an insurance company may want to see average speeds for all devices or vehicles over a period of time in a particular area or at a particular location or may want to see an average speed for a device or vehicle during a particular time period for a segment.

As illustrated by FIG. 7E, when the data is consumed by the third party, different fields such as internal identification number used by the system gathering and normalizing the data for further usage, the parent account identifier, and/or the child account identifier may not be visible to the third party. Although the invisible filed shown in FIG. 7E includes internal identification number used by the system gathering and normalizing the data for further usage, the parent account identifier, and/or the child account identifier, other fields may be made invisible depending on the purpose of the application and the access privileges granted to that application, which may also be provided through obfuscation and/or anonymization rules.

FIG. 8 illustrates a process for publishing device data to a receiver endpoint in accordance with one of the embodiments. A device posts data to a container via step 802 based on the data description. The system looks up the data model associated with the container via step 804 and stores the received data indexed by time via step 806. The system then checks if the index is configured for any parameter on the data model via step 808. If it is, the system extracts the parameter from the device data and stores data by the value index of the parameter via step 810. If the index is not configured for any parameter, the system further checks if the data decoration for that data is configured via step 812. If the data decoration is configured, the system processes the data decoration via step 814. If the data decoration is not configured, the system looks up subscriptions associated with the container step 816. Alternatively, the system looks up subscriptions associated with the container step 816, after processing the data decoration. Thus, the system may or may not process data decoration depending on the configuration.

The system then checks if any subscription is configured, or associated, with the data via step 818. If it is, the system stores the device data in a queue for publishing via step 820, processes the subscription rules step 822, and publishes the processed data by forwarding it to a receiver endpoint 824 as directed by the subscription rules in step 822. However, if no subscription is configured, the data is stored without further evaluation. The details of subscription rule processing step 822 are illustrated in FIGS. 5A and 5B and described in detail in the description accompanying FIGS. 5A and 5B.

Figure 9A:
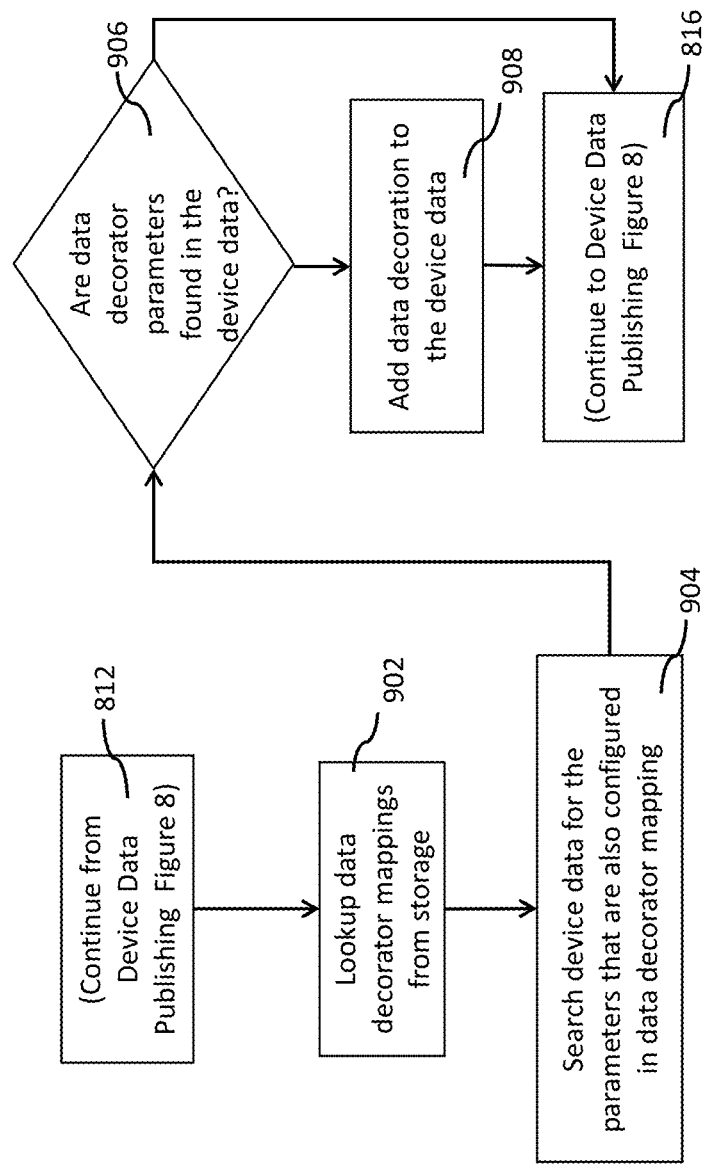
FIG. 9A is a flow diagram illustrating various steps involved in the process of data decoration, according to one or more embodiments of the present invention.

FIG. 9A is a flow diagram illustrating various steps involved in the process of augmenting or enriching received device data with other external data, for example to reduce the amount of data that a device needs to send, and to improve usefulness to the end user through a process known as data decoration step 814 as shown in FIG. 8. If data decoration is configured for any device data associated with a particular container, the system processes the data decoration via step 814, by looking up decorator mappings from storage via step 902. The system then searches the device data for parameters that are also configured in data decorator mapping via step 904. If the data decorator parameters are found in the device data via step 906, the system adds the data decoration to the device data via step 908. The system then looks up subscriptions associated with the container via step 816 as shown in FIG. 8.

FIG. 9B illustrates an example of data decoration mapping. For example, if the device data contains a parameter called "serial number" and the value of the parameter is "1234", and that data is configured with data decoration mapping, then the gateway application or system, using decoration mapping, can add "taxi number" and "driver" to the data received from that device and store the data together with its data decorations and publish the processed data as described below. The end user may use this system as shown in the following example. A taxi company installs a tracking device with serial number 1234 in a taxi with vehicle number 22. The device may be configured to send only location data associated with its device identification number, but the end user, the taxi company, also wants to know on which taxi this device is installed and which driver is currently driving the taxi. The taxi company configures an application enablement platform, also known as application middleware, to associate taxi number and driver name with a device serial number using a separate look up function by provisioning a "data decorator mapping on device serial number" in the application enablement platform. In the example, the application enablement platform will see the instruction for performing data decoration mapping on the data received from that device and then add taxi number and driver name to the location data before storing the augmented data feed in the container and the publishing queue. The application of the taxi company can now process the device data as if the device had sent the taxi number and driver name as well as the location data.

Figure 10:
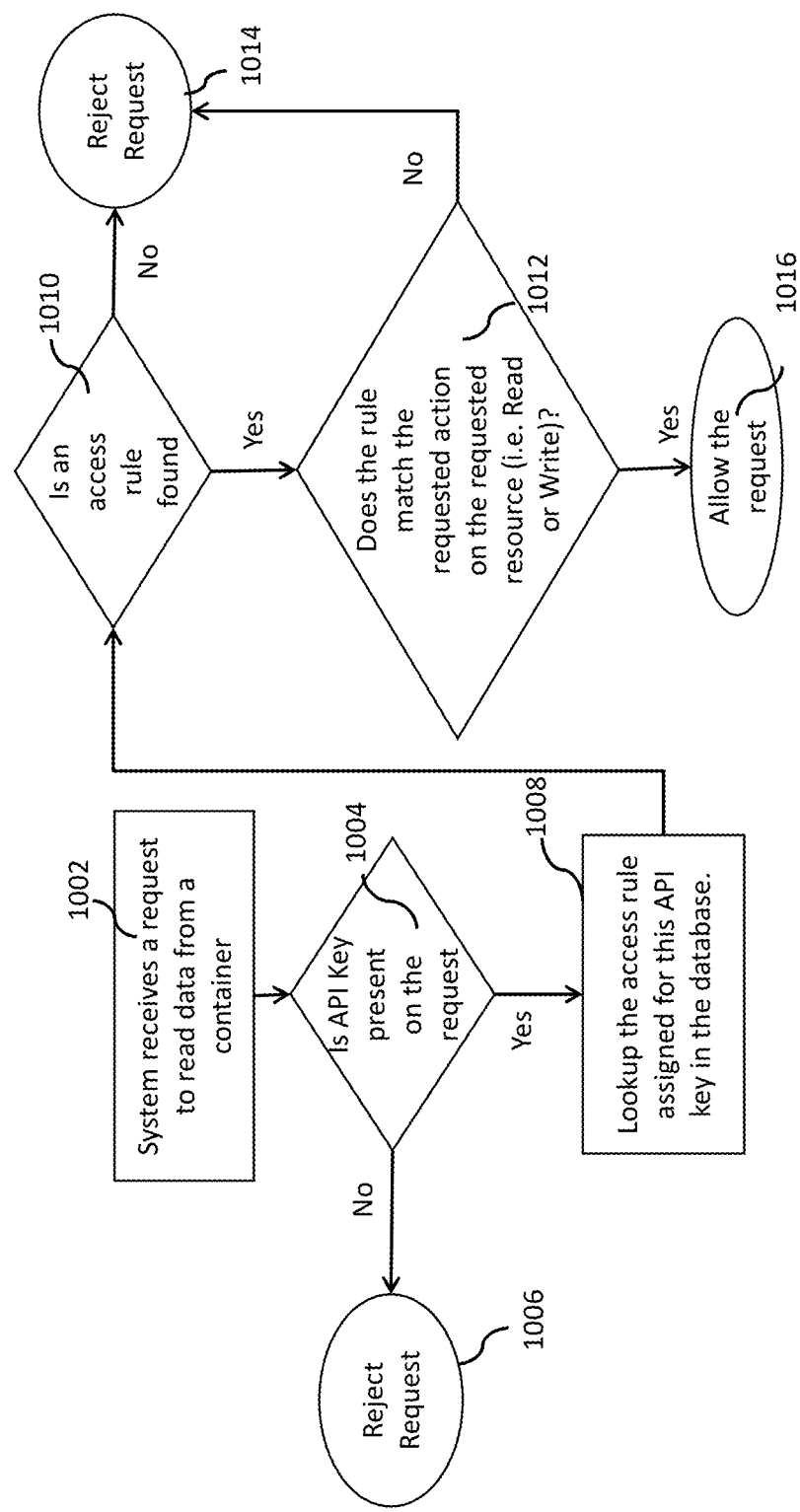
FIG. 10 is a flow diagram illustrating use of an application programming interface (API) key for reading and/or posting data to containers according to one or more embodiments of the present invention.

FIG. 10 is a flow diagram illustrating the use of an application programming interface (API) key to govern access to containers, either for devices to post data to the container or for end users or end user applications to retrieve data from a container. The application programming interface (API) key is created, in an embodiment, using an account key. The account key can also be an API key, however, an API key is not always an account key. An API key is assigned read/write privileges to individual resources whereas the account key is always assigned read/write privileges for all sources.

As the device data management system receives a request to write data to a container, for example from devices to post data, or to read data from a container, for example from end users with subscriptions to access data via step 1002, it checks for the presence of an API key on the request via step 1004. If no such key is found, the system rejects the request via step 1006. If the API key is present on the request, the system then looks up the access rule assigned for this API key in the database via step 1008. The request is rejected if the access rule is not found step 1014. If the access rule is found it checks to see if the rule matches the requested action on the requested resource via step 1012, for example read or write. If the rule matches the requested action, the request is allowed via step 1016, and if the rule does not match the requested action, the request is rejected via step 1014.

Figure 11:
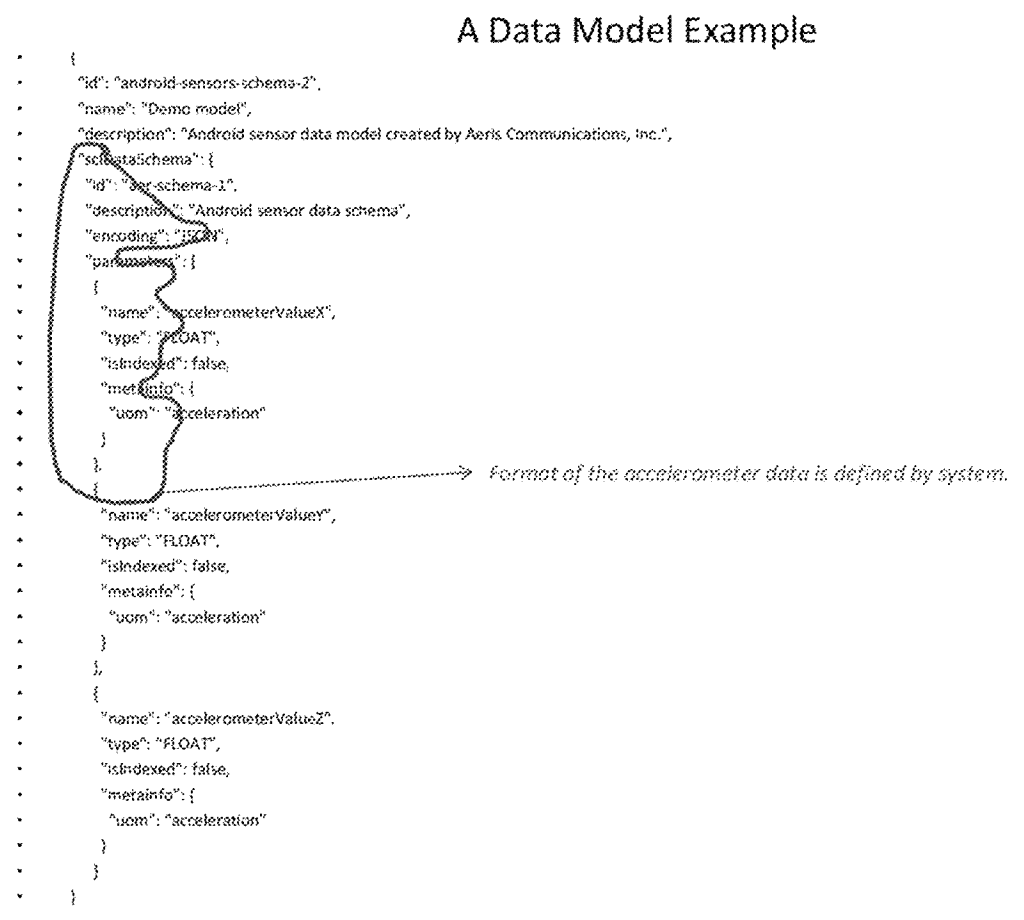

FIG. 11 illustrates an example of a data model, in accordance with one of the embodiments. As shown in the example, a data model comprises one or more data fields, for example, "name", "type". A container is associated with a specific data model depending on the data description for that data model. System uses data models to extract data fields from raw device data.

Figure 12:
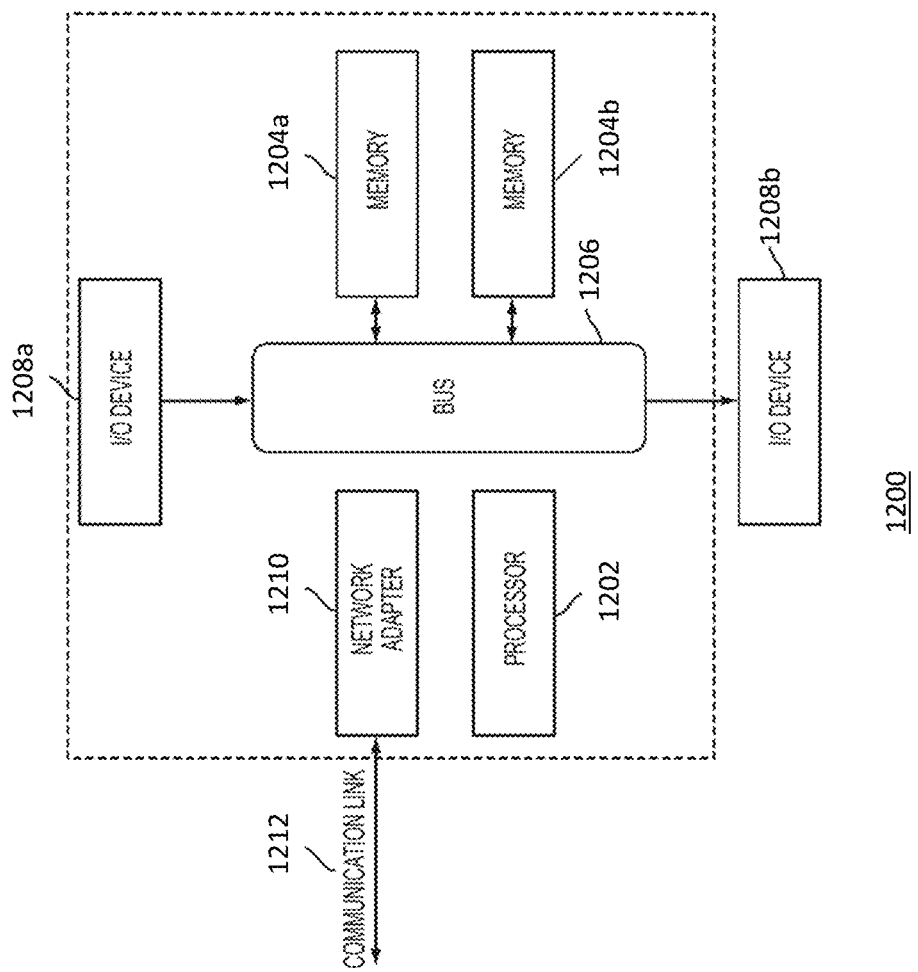
FIG. 12 illustrates a data processing system 1200 suitable for storing the computer program product and/or executing program code in accordance with one or more embodiments of the present invention.

FIG. 12 illustrates a data processing system 1200 suitable for storing the computer program product and/or executing program code or computer readable instructions in accordance with an embodiment of the present invention. The data processing system 1200 includes a processor 1202 coupled to memory elements 1204*a-b* through a system bus 806. In other embodiments, the data processing system 1200 may include more than one processor and each processor may be coupled directly or indirectly to one or more memory elements through a system bus.

Memory elements 1204*a-b* can include local memory employed during execution of the program code, bulk storage, and cache memories that provide temporary storage of at least some program code in order to reduce the number of times the code must be retrieved from bulk storage during execution. As shown, input/output or I/O devices 1208*a-b* (including, but not limited to, keyboards, displays, pointing devices, etc.) are coupled to the data processing system 1200. The I/O devices 1208*a-b* may be coupled to the data processing system 800 directly or indirectly through intervening I/O controllers (not shown).

In FIG. 12, a network adapter 1210 is coupled to the data processing system 1202 to enable data processing system 1202 to become coupled to other data processing systems or remote printers or storage devices through communication link 1212. Communication link 1212 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk, and an optical disk.

Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

Similarly, it is envisioned by the present invention that the term communications network includes communications across a network (such as that of a network for machine-to-machine or M2M communications but not limited thereto) using one or more communication architectures, methods, and networks, including but not limited to: Code division multiple access (CDMA), Global System for Mobile Communications (GSM), Universal Mobile Telecommunications System (UMTS), Long Term Evolution (LTE), 4G LTE, 5G, wireless local area network (such as WiFi), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

What is claimed is:

1. A computer-implemented method, wherein the computer-implemented method is implemented by a processing system including a processor, the computer-implemented method comprising:
    receiving, over a communication network, device data from a plurality of Internet of Things (IoT) devices resulting in received device data;
    utilizing a data description to describe a type of data received from the plurality of IoT devices used for machine to machine (M2M) applications;
    extracting one or more parameter values from the received device data;
grouping the extracted one or more parameter values;
    storing the one or more parameter values into a plurality of containers based on a data model;
    configuring at least one subscription identifier to at least one of the plurality of containers, wherein the at least one subscription identifier is associated with each receiver endpoint device from a group of receiver endpoint devices and at least one rule identified by the subscription identifier;
    augmenting the received device data with external data, to reduce an amount of data that needs to be sent to a receiver endpoint device of the group of receiver endpoint devices and to improve usefulness to an end user resulting in augmented data;
    determining a first receiver endpoint device from the group of receiver endpoint devices resulting in a first determination;
    based on the first determination, obfuscating a first portion of the augmented data resulting in first obfuscated data;
    transmitting the first obfuscated data in the at least one of the one or more containers to the first receiver endpoint device;
    determining a second receiver endpoint device from the group of receiver endpoint devices resulting in a second determination;
    based on the second determination, obfuscating a second portion of the augmented data resulting in second obfuscated data; and
    transmitting the second obfuscated data in the at least one of the one or more containers to the second receiver endpoint device.

2. The computer-implemented method of claim 1, wherein the at least one rule is applied to one or more conditions, associated with a type of action, based on an outcome of application of the rules, the action to be performed on the received device data through and use of an executable program and an using application programming interface (API) key to manage access to the received device data following performance of the action.

3. The computer-implemented method of claim 1, further comprising: configuring the at least one rule with a programming source code, wherein an action type is to send the received device data to an internal system process to execute the programming source code.

4. The computer-implemented method of claim 3, wherein the internal system process includes one of:
    connecting each of the plurality of IoT devices to a global endpoint device of a network provider at a first instance of connection and directing the received device data to a receiver endpoint device of the group of receiver endpoint devices at a second instance;
    collecting data continually for a period of time based on context of use and memory provided to the processing system, utilizing a queuing mechanism to receive the received device data before the received device data is stored into a database and allowing the processing system to proceed to a next event;
    converting the received device data received in device specific format to normalized data format utilizing one or more adapters via data driven parsers that extract application-specific data into the normalized data format; and
    providing anonymization rules to an application programming interface (API) to anonymize the received device data before sending it to a receiver endpoint device from the group of receiver endpoint devices, or a combination thereof.

5. The computer-implemented method of claim 1, comprising:
    utilizing at least one rule to determine an action involving the augmenting of the received device data is to be performed;
    utilizing an executable program to associate the external data located in a datastore with the received device data; and
    processing the augmented data in accordance with associated subscription information.

6. A computer-implemented system used for machine to machine (M2M) applications, the system comprising:
    a gateway including a processor; and
    a memory that stores executable instructions that, when executed by the gateway, facilitate performance of operations, the operations comprising:
        configuring a gateway with a data model of a device data feed, wherein the gateway is between a plurality of Internet of Things (IoT) devices and a group of receiver endpoint devices;

receiving, over a communication network, device data from the plurality of IoT devices resulting in received device data;

extracting one or more parameter values from the received device data;

grouping the one or more parameter values;

storing the one or more parameter values into a plurality of containers based on the data model;

augmenting the received device data with external data, to reduce an amount of data that needs to be sent to a receiver endpoint device of the group of receiver endpoint devices and to improve usefulness to an end user resulting in augmented data;

augmenting the received device data with subscription information associated with the received device data, wherein the subscription information comprises an identifier associated with a receiver endpoint device from the group of receiver endpoint devices, and at least one rule uniquely identified by a subscription's identifier;

determining a first receiver endpoint device from the group of receiver endpoint devices resulting in a first determination;

based on the first determination, obfuscating a first portion of the augmented data resulting in first obfuscated data;

transmitting the first obfuscated data in the at least one of the one or more containers to the first receiver endpoint device;

determining a second receiver endpoint device from the group of receiver endpoint devices resulting in a second determination; and based on the second determination, obfuscating a second portion of the augmented data resulting in a second obfuscated data in the at least one of the one or more containers to the second receiver endpoint device.

7. The computer-implemented system of claim 6, wherein the at least one rule comprises any of:
one or more conditions resulting in an action;
an action type based on an outcome of evaluation of the rules; and
a source code of an executable program to carry out the action type based on the outcome of evaluation of the rules using an application programming interface (API) key to manage access to the received device data following performance of the action.

8. The computer-implemented system of claim 7, wherein the operations comprise:
configuring the at least one rule with a programming source code, wherein the action type is to send the device data to an internal system process to execute the source code.

9. The computer-implemented system of claim 6, wherein the at least one rule is applied to one or more conditions, associated with a type of action, based on an outcome of application of the rules, the action to be performed on the received device data through and use of an executable program and using an application programming interface (API) key to manage access to the received device data following performance of the action.

10. The computer-implemented system of claim 9, wherein an internal system process includes one of:
connecting each of the plurality of IT devices to a global endpoint device of a network provider at a first instance of connection and directing the received device data to a received endpoint device of the group of receiver endpoint devices at second instance;

collecting data continually for a period of time based on context of use and memory provided to the gateway, utilizing a queuing mechanism to receive the received device data before the received device data is stored into a database and allowing the gateway to proceed to a next event;

converting the received device data received in device specific format to normalized data format utilizing one or more adapters via data driven parsers that extract application-specific data into the normalized data format; and providing anonymization rules to an application programming interface (API) to anonymize the received device data before sending it to a receiver endpoint device from the group of receiver endpoint devices, or a combination thereof.

11. The computer-implemented system of claim 6, wherein the operations comprise:
utilizing at least one rule to determine an action involving the augmenting of the received device data is to be performed;
utilizing an executable program to associate the external data located in a datastore associated with the received device data when a condition of the rule is satisfied; and
processing the augmented data in accordance with the subscription information.

12. A non-transitory machine-readable medium comprising executable instructions that, when executed by a processing system including a processor, facilitate performance of operations comprising:
receiving, over a communication network, device data from a plurality of Internet of Things (IoT) devices resulting in received device data;
utilizing a data model to describe type of data received from the plurality of IoT devices used for machine to machine (M2M) applications;
extracting one or more parameter values from the received device data;
grouping the one or more parameter values;
storing the one or more parameter values into a plurality of containers based on a data description
configuring at least one subscription identifier to at least one of the plurality of containers, wherein the at least one subscription identifier is associated with each receiver endpoint device from a group of receiver endpoint devices and at least one rule identified by the subscription identifier
augmenting the received device data with external data, to reduce an amount of data that needs to be sent to a receiver endpoint device of the group of receiver endpoint devices and to improve usefulness to an end user resulting in augmented data;
determining a first receiver endpoint device from the group of receiver endpoint devices resulting in a first determination;
based on the first determination, obfuscating a first portion of the augmented data resulting in first obfuscated data;
transmitting the first obfuscated data in the at least one of the one or more containers to the first receiver endpoint device;
determining a second receiver endpoint device from the group of receiver endpoint devices resulting in a second determination;

based on the second determination obfuscating a second portion of the augmented data resulting in second obfuscated data; and transmitting the second obfuscated data in the at least one of the one or more containers to the second receiver endpoint device.

13. The non-transitory machine-readable medium of claim 12, wherein the at least one rule comprises of one or more conditions resulting in actions, an action type based on an outcome of evaluation of the rules, and a source code of an executable program to carry out the action type based on the outcome of evaluation of the rules using an application programming interface (API) key to manage access to the received device data.

14. The non-transitory machine-readable medium of claim 13, wherein the operations comprise:

configuring the at least one rule with a programming source code, wherein the action type is to send the received device data to an internal system process to execute the source code.

15. The non-transitory machine-readable medium of claim 14, wherein an internal system process includes one of:

connecting each of the plurality of IoT devices to a global endpoint device of a network provider at a first instance of connection and directing the received device data to a receiver endpoint device of the group of receiver endpoint devices at a second instance;

collecting data continually for a period of time based on context of use and memory provided to the processing system, utilizing a queuing mechanism to receive the received device data before the data is stored into to a database and allowing the processing system to proceed to a next event;

converting the received device data received in device specific format to normalized data format utilizing one or more adapters via data driven parsers that extract the application-specific data into the normalized data format; and providing anonymization rules to an application programming interface (API) to anonymize the received device data before sending it to a receiver endpoint device from the group of receiver endpoint devices, or a combination thereof.

16. The non-transitory machine-readable medium of claim 12, wherein the operations comprise:

utilizing at least one rule to determine an action involving the augmenting of the received device data is to be performed utilizing an executable program to associate the external data located in a datastore associated with the received device data; and processing the augmented data in accordance with associated subscription information.

17. The computer-implemented method of claim 1 for managing device data feeds, comprising:

receiving user-generated input from a computing device associated with an operator of the plurality of IoT devices;

receiving, over the communication network, second device data from the plurality of IoT devices resulting in second received device data;

augmenting the second received device data with the external data resulting in second augmented data;

determining that the second received device data is to be sent to the second receiver endpoint device from the group of receiver endpoint devices resulting in a third determination;

based on the third determination and the user-generated input, determining that no portion of the second augmented data is to be obfuscated resulting in a fourth determination; and based on the fourth determination, transmitting the second augmented data in the at least one of the one or more containers to the second receiver endpoint device.

18. The computer-implemented system of claim 6, wherein the operations comprise:

receiving user-generated input from a computing device associated with an operator of the plurality of IoT devices;

receiving, over the communication network, second device data from the plurality of IoT devices resulting in second received device data;

augmenting the second received device data with the external data resulting in second augmented data;

determining that the second received device data is to be sent to the second receiver endpoint device from the group of receiver endpoint devices resulting in a third determination;

based on the third determination and the user-generated input, determining that no portion of the second augmented data is to be obfuscated resulting in a fourth determination; and based on the fourth determination, transmitting the second augmented data in the at least one of the one or more containers to the second receiver endpoint device.

19. The computer-implemented system of claim 6, further comprising:

a telematics unit communicatively coupled to a vehicle, wherein a first portion of the plurality of IoT devices are communicatively coupled with the telematics unit, wherein the receiving of the device data from the plurality of IoT devices comprises receiving, over the communication network, a third portion of the received device data from the first portion of the plurality of IoT devices, wherein the third portion of the received device data comprises location data associated with the vehicle and speed data associated with the vehicle, wherein the augmented data comprises the location data and the speed data, wherein the first portion of the augmented data comprises the location data such that the location data is obfuscated, wherein the second portion of the augmented data comprises the speed data such that the speed data is obfuscated.

20. The non-transitory machine-readable medium of claim 12, wherein the operations comprise:

receiving user-generated input from a computing device associated with an operator of the plurality of IoT devices;

receiving, over the communication network, second device data from the plurality of IoT devices resulting in second received device data;

augmenting the second received device data with the external data resulting in second augmented data;

determining that the second received device data is to be sent to the second receiver endpoint device from the group of receiver endpoint devices resulting in a third determination;

based on the third determination and the user-generated input, determining that no portion of the second augmented data is to be obfuscated resulting in a fourth determination; and based on the fourth determination, transmitting the second augmented data in the at least one of the one or more containers to the second receiver endpoint device.

* * * * *